US006370873B1

(12) United States Patent
Schaich et al.
(10) Patent No.: US 6,370,873 B1
(45) Date of Patent: Apr. 16, 2002

(54) HYDRAULIC DRIVE FOR A PRESS

(75) Inventors: Guenther Schaich, Kirchheim-Teck; Joachim Beyer, Ravensburg, both of (DE)

(73) Assignee: Mueller-Weingarten AG, Weingarten (DE)

( * ) Notice: Subject to any disclaimer, the term of this patent is extended or adjusted under 35 U.S.C. 154(b) by 0 days.

(21) Appl. No.: 09/351,918

(22) Filed: Jul. 14, 1999

(30) Foreign Application Priority Data

Jul. 15, 1998 (DE) ........................................ 198 31 624

(51) Int. Cl.7 ................................................ F16D 31/02

(52) U.S. Cl. ........................................... 60/413; 60/419

(58) Field of Search .......................... 60/419, 413, 368

(56) References Cited

U.S. PATENT DOCUMENTS 4,026,107 A * 5/1977 Kosek et al. ................ 60/413
5,568,766 A * 10/1996 Otremba et al. .............. 100/35
5,852,933 A * 12/1998 Schmidt ...................... 60/413

FOREIGN PATENT DOCUMENTS

DE 44 29 782 A1 3/1995
DE 44 36 666 A1 4/1996

OTHER PUBLICATIONS

German Patent Office Search Report, Feb. 10, 1999.

* cited by examiner

*Primary Examiner*—Edward K. Look
*Assistant Examiner*—Michael Leslie
(74) *Attorney, Agent, or Firm*—Morgan, Lewis & Bockius LLP

(57) ABSTRACT

A hydraulic drive for a press and in particular for a press for the simulation of the operating conditions of mechancial presses for large parts or the like is proposed. In order to also make such a hydraulic simulation press available for pilot lots or small lots with a considerable improvement in efficiency, a so-called hydraulic transformer, which consists of hydraulic devices adjustable in angular travel, is assigned to the drive.

13 Claims, 1 Drawing Sheet

Figure 1:
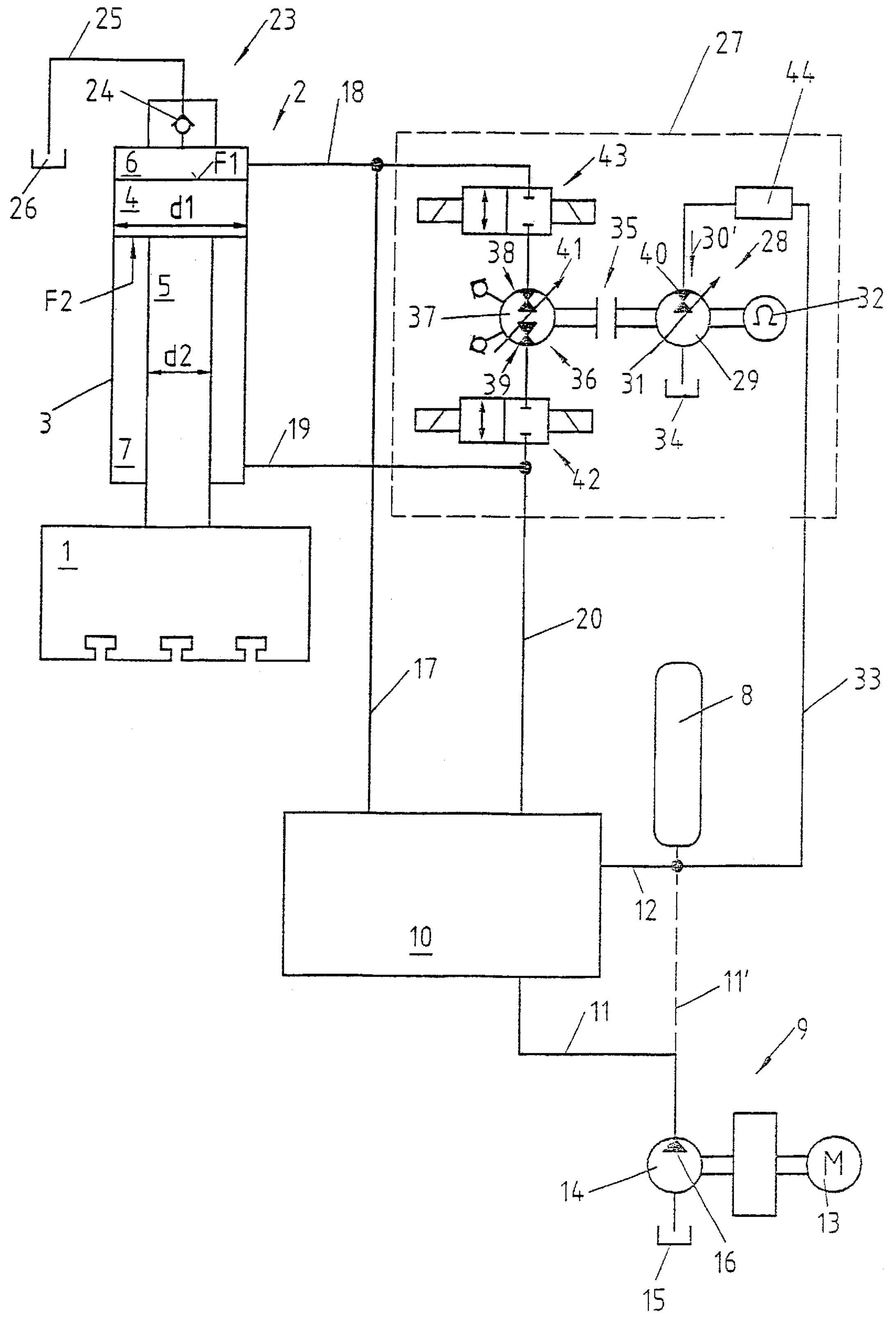

HYDRAULIC DRIVE FOR A PRESS this application claims the benefit of German Application No. 198 31 624.0, filed in Germany on Jul. 15, 1998.

FIELD OF THE INVENTION

The present invention relates to a hydraulic drive for a press, and more particularly, to a hydraulic drive using a hydraulic transformed.

DISCUSSION OF THE RELATED ART

Depending on the type of drive, a distinction is made between mechanical and hydraulic presses. In so-called progressive or transfer presses, the workpiece is produced by a plurality of working operations. The shaping of upper tool and lower tool in the respective stage determines the progress of the machining operation. The same applies to so-called progressive presses for large parts, in which tool size and transport steps generally turn out to be larger than in normal progressive or transfer presses. All the ram movements are effected in a synchronized manner from a central main drive via a press drive mechanism located in the head piece of the press. In this case, the longitudinal and/or transverse movements, controlled via cam mechanisms, and any stroke movements of the transport device for the workpiece transport are derived from the main drive and are thus synchronized with the ram movement. As a result, the movements of such progressive or transfer presses or presses for large parts are geometrically fixed with regard to the forming path within the stage and with regard to the transport operation between the stages. Such presses are designed, for example, as eccentric or crank presses. The kinematics of the slider-crank mechanism determine the movement of the working ram, the respective crank angle determining the forming force. In this case, the energy is obtained from a flywheel, which drives the crankshaft. Furthermore, the ram speed is directly related to the crank angle, and a rigid process sequence is thus obtained. Mechanical presses have a high efficiency and may be operated with a high stroke rate, since only as much energy as required for the press movement and the operating cycle is removed from the flywheel.

Hydraulically actuated presses work according to the hydrostatic principle with a uniform propagation of pressure in a fluid, the pressure producing a force on a piston area of a cylinder/piston system, this force being proportional to the pressure. As a result, a hydraulically driven ram can develop a force up to the level of the rated force of the press at any point of the ram stroke and thus independently of the tool position. Hydraulic presses are therefore preferred in those fields of metal-forming technology in which the force has to be constant along the ram path or has to be controlled due to the process and also where a large forming path is necessary.

The drive of the cylinder/piston systems of hydraulic presses and thus the drive of the ram movement are effected either directly by fixed-displacement pumps (gear or screw pumps) or, in larger machines, by adjustable axial—or radial-piston pumps. In the process, operating pressures of, for example, 200–300 bar are produced.

The drive of a hydraulic press with accumulator drive is unlike such a direct pump drive. The pump in the direct drive acts directly on the cylinder/piston system during each operating cycle, whereas the pump in the pressure-accumulator drive pressurizes a high-pressure accumulator, from which the working cylinder is then fed with rated pressure via a proportional valve or servo valve. In the direct pump drive, therefore, the pump and the drive motor must be designed for the greatest instantaneous power requirement of the press. Via an adjustment of the delivery quantity of the high-pressure pump, the ram speed is thus usually infinitely variable. In contrast, the speed of the ram in the pressure-accumulator drive is only influenced indirectly by the pump output, so that the pump output may be designed for an average energy requirement and may thus be of smaller proportions. The energy capability in the accumulator drive is then limited to the energy stored in the high-pressure accumulator for these reasons hydraulic presses can be used more flexibly in their mode of operation than mechanical presses.

It is also possible, and known per se, to reproduce the motion and force characteristic of a mechanical press on a hydraulic press. This possibility is utilized when, during a planned changeover in production, other parts or new parts are to be produced on a press for large parts.

To incorporate and optimize these tools for use on a press for large parts, and a hydraulic press on which the individual forming stages of the press for large parts are simulated is then used.

The considerably more expensive press for large parts is thus not blocked by the coordination of tool sets and is thus fully available for the production process.

On account of the tool sets optimized in the hydraulic press, the press for large parts, after tool change has been effected, can continue the production without considerable interruption.

The applicability of such known simulation presses is very restricted on account of the mode of operation. The hydraulic pressure accumulators always have to be charged to the maximum potential of the rated pressure and deliver this maximum pressure during every operating cycle. Excess energy is dissipated via chokes, which leads to a high energy loss. The accumulators must always be re-charged to rated pressure, which has an adverse effect on the efficiency. The stroke rate, at, for example, 1–2 strokes/min, also turns out to be very low in such simulation presses, so that they are more likely to work inefficiently. However, this is not of importance for pure simulation operation, i.e. for a trial phase.

SUMMARY OF THE INVENTION

The object of the invention is to extend the range of use of such hydraulic simulation presses. In particular, such that a hydraulic simulation press may also be used for pilot lots or small lots. At the same time, the efficiency is to be substantially improved.

This object is achieved by the features of the claimed invention.

The basic idea underlying the invention is that a conventional hydraulic simulation press is constructionally extended by virtue of the fact that a certain production operation for the production of pilot lots or small lots is also possible with this press. This is done by supplementing the conventional hydraulic press with a type of "hydraulic transformer", by means of which the mode of operation can be changed from a simulation operation to a production operation without problem. In this case, the so-called "hydraulic transformer" is formed by an arrangement of several hydraulic devices adjustable in angular travel, as known in principle as so-called hydraulic motors and hydraulic pumps. To this end, reference is made, for example, to DE 44 29 782 A1 of the applicant, in which a corresponding arrangement of hydraulic devices, adjustable in angular travel, for the drive of a cylinder/piston unit is shown. By means of such devices, a hydraulic press can be changed over from a simulation operation to a production operation. In this case, the so-called hydraulic transformer is switched off during the simulation operation and is switched on during the production operation. The ram speed can be reduced during the production operation to, for example, 30–60 mm/sec, depending on the size of the transformer, 4–6 strokes/min permitting a higher output of parts. By the additional connection of the hydraulic transformer, the efficiency is increased to 60–75%, in which case working strokes of about 150 mm at an overall stroke of about 700 mm can be set without problem. The cycle times are in the order of magnitude of <10 seconds. In accordance with this data, pilot lots or small lots can therefore be run efficiently, so that such a hydraulic press is given substantially extended applicability. This leads to a considerably enlarged range of use of such special presses. It may be used both as a simulation press for setting-up work, e.g. of a press for large parts, and as a production press for small lots.

The invention is explained in more detail below with reference to the drawing and the exemplary embodiment described herewith.

The figure shows a basic representation of the construction and the system scheme of the invention.

DESCRIPTION OF THE PREFERRED EMBODIMENT

Shown in the figure for a hydraulic press (not shown in any more detail) is a press ram 1, which accommodates an upper tool (not shown in any more detail) on its underside. The up and down movement of the press ram 1 is effected hydraulically via at least one cylinder/piston unit 2, which acts on the press ram 1 and serves as a stroke and working cylinder for carrying out the forming operation on the workpiece. The cylinder/piston unit 2 has a working cylinder 3, in the interior of which a working piston 4 is moved up and down. On its underside, the working piston 4 has a piston rod, 5, which is connected to the press ram 1. A cylinder space 6 which is circular-cylindrical in cross section is located above the working piston 4, and a cylinder space 7 of annular shape in cross section is located below the working piston 4. The effective circular-cylindrical top pressure area $F_1$ on the working piston 4 is therefore determined by the diameter $d_1$ of the working piston 4. The effective bottom annular pressure area $F_2$ is formed by the difference in area between the diameter $d_1$ of the working piston 4 and the diameter $d_2$ of the piston rod 5.

The press according to the invention has two operating states. The first operating state as so-called "simulation operation" will be explained first.

Simulation Operation

In a manner similar to a conventional hydraulic simulation press, the cylinder/piston unit 2 is actuated by means of a pressure-accumulator drive. For this purpose, a high-pressure accumulator 8 is charged to the maximum requisite pressure by means of a pump arrangement 9, a control block 10 connecting the line sections 11, 12 between pump arrangement 9 and high-pressure accumulator 8. To charge the high-pressure accumulator 8, a direct connection (line 11') would also be possible. The pump arrangement 9 for an accumulator drive normally consists of a fixed-displacement pump, a zero-stroke pump or a variable-displacement pump. Shown for the sake of simplicity is a drive motor 13 for a feed pump 14, which delivers the hydraulic medium from an oil reservoir or tank 15. The delivery direction of the fixed-displacement pump 14 shown is symbolized by the arrow 16.

To operate the cylinder/piston unit, the control block 10 contains a proportional-valve arrangement, so that the hydraulic medium is directed from the high-pressure accumulator 8 at rated pressure via a proportional-valve arrangement or servo valve (continuous valve), arranged in the control block 10, and via the feed line 17 with the supplementary line 18 to the top circular-cylindrical cylinder space 6 of the cylinder/piston unit. At the same time, the hydraulic medium is directed from the annular cylinder space 7 via a supplementary line 19 and via the line 20 to the control block 10, the pressure relief of the pressure medium being effected from the cylinder space 7 to an oil reservoir (not shown in any more detail). As a result, the press ram 1 is actuated in the downward direction.

The upward movement of the press ram 1 is effected by pressurizing the bottom cylinder space 7 with simultaneous relief of the top cylinder space 6. In the simulation operation shown and described, the operating states explained in the introduction to the description are run for the simulation of a mechanical press, in particular a transfer press or a press for large parts. These hydraulic simulation presses are known in principle from their construction and their mode of operation.

Production Operation

According to the invention, the conventional hydraulic simulation press described above is supplemented with a so-called hydraulic transformer 27, as enclosed by a broken line in the representation in the figure. This transformer 27 includes a first hydraulic device 28, which is includes a as motor/pump arrangement 29 adjustable in angular travel. This arrangement is operated in particular as a hydraulic motor in the direction of flow indicated by arrow 30, the adjustability, shown by the arrow 31, of this hydraulic motor permitting a varied capacity and thus a varied delivery flow. The rotary speed of the hydraulic motor is detected by a speed controller 32. The hydraulic motor 29 is driven via the high-pressure accumulator 8 and via the feed line 33. An oil tank 34 serves to receive the hydraulic medium flowing through the hydraulic motor 29.

A second hydraulic device 36 is connected via a mechanical coupling device 35 to the hydraulic device 28 acting as hydraulic motor. This hydraulic device 36 also includes as a pump/motor device 37 adjustable in angular travel, the top and bottom double arrows 38, 39 illustrating the mode of operation of this device as a pump or a motor in two directions of flow in each case. In contrast, the single top double arrow 40 in the hydraulic device 29 points to the fact that this arrangement can be actuated as a hydraulic motor or as a pump in only one opposite direction of flow. The pressure medium discharging from the high-pressure accumulator 8 therefore drives the hydraulic motor 29, which in turn, by means of a specific and controllable setting via the coupling arrangement 35, drives the device 37 acting as a hydraulic pump. This pump arrangement, too, is adjustable in angular travel in accordance with the arrow representation 41, so that the capacity of the pump and thus the the delivery throughflow are infinitely variable by the hydraulic pump.

A first shut-off valve 42 is assigned to the hydraulic pump 37 in the inlet region and a further shut-off valve 43 is assigned to the hydraulic pump 37 in the outlet region, said valves feeding or preventing the throughflow of the pressure medium through the hydraulic transformer or repectively switching the hydraulic transformer on or off. In the representation shown, the passage through these valves is depicted as being shut.

A further shut-off valve 44 is arranged as a so-called hydraulic connector between the high-pressure accumulator 8 and the first hydraulic device 28.

The operation of the hydraulic transformer for actuating the press ram 1 therefore takes place in a controlled manner via the pressure medium of the high-pressure accumulator 8, which drives the hydraulic motor 29. This hydraulic motor 29 in turn, via the coupling arrangement 35, drives the hydraulic pump 37, which is adjustable in angular travel and delivers hydraulic medium from the bottom cylinder space 7 via the line 19 to the top cylinder space 6. This mode of operation is explained in principle in great detail in German Patent No. DE 44 29 782 A1 to the applicant. This publication is explicitly used in order to explain this action.

The hydraulic transformer 27 therefore makes it possible to complement the press explained with regard to the simulation operation in order to carry out a production operation, specific control of the pressure characteristic being made possible via the two hydraulic devices 28, 36. The special advantage lies in the interaction of the conventional hydraulic press arrangement with the pressurizing of the cylinder/piston unit 2 via the medium of the pressure-medium accumulator 8 and the additional use of a so-called hydraulic transformer 27.

If the press ram 1 is retracted into its initial position in the production operation, this likewise takes place via the hydraulic transformer, i.e. the hydraulic medium from the top cylinder space 6 is delivered via the delivery line 18, the valve arrangement 43, the hydraulic pump 37, the second valve arrangement 42 and via the line 19 into the bottom cylinder space 7. In the process, the direction of flow through the hydraulic pump 37 is reversed. The drive of this movement may again be controlled by the hydraulic motor 29.

The invention is not restricted to the exemplary embodiment shown and described. On the contrary, all the modifications within the scope of the patent claims are included.

List of designations:

| | |
|---|---|
| 1 | Press ram |
| 2 | Cylinder/piston unit |
| 3 | Working cylinder |
| 4 | Working piston |
| 5 | Piston rod |
| 6 | Circular-cylindrical cylinder space |
| 7 | Annular cylinder space |
| 8 | High-pressure accumulator |
| 9 | Pump arrangement |
| 10 | Control block |
| 11 | Line sections |
| 12 | Line sections |
| 13 | Drive motor |
| 14 | Feed pump |
| 15 | Oil reservoir/tank |
| 16 | Arrow |
| 17 | Feed line |
| 18 | Supplementary line |
| 19 | Supplementary line |
| 20 | Line |
| 23 | Prefilling device |
| 24 | Check valve |
| 25 | Hydraulic line |
| 26 | Oil reservoir |
| 27 | Hydraulic transformer |
| 28 | First hydraulic device adjustable in angular travel |
| 29 | Motor/pump arrangement |
| 30 | Arrow |
| 31 | Arrow |
| 32 | Speed controller |

-continued

List of designations:

| | |
|---|---|
| 33 | Feed line |
| 34 | Oil tank |
| 35 | Mechanical coupling device |
| 36 | Second hydraulic device |
| 37 | Pump/motor device |
| 38 | Double arrow |
| 39 | Double arrow |
| 40 | Double arrow |
| 41 | Arrow |
| 42 | Shut-off valve |
| 43 | Shut-off valve |
| 44 | Shut-off valve (hydraulic connector) |

What is claimed is:

1. A hydraulic press comprising:

a cylinder/piston;

a press ram coupled to said cylinder/piston;

a drive unit;

an accumulator drive including a high-pressure accumulator, said high-pressure accumulator adapted to be pressurized with a hydraulic fluid by said drive unit, said press ram being operated by said accumulator drive in a first operation mode for simulating a mechanical press having a high ram speed and a low stroke rate; and a hydraulic transformer including a first hydraulic device and a second hydraulic device, said first hydraulic device being operable by said accumulator, said second hydraulic device coupled with and driven by said first hydraulic device, said press ram being operated by said hydraulic transformer in a second operation mode having a low ram speed and a high stroke rate, wherein a hydraulic connector decouples said first hydraulic device from the accumulator during the first operation mode.

2. The hydraulic press according to claim 1, further comprising;

a control block operatively connecting said drive unit to said high-pressure accumulator and said high-pressure accumulator to said press ram, said control block controlling a motion of said press ram in the first operation mode.

3. The hydraulic press according to claim 2, wherein said press ram has a speed less than 500 mm/sec and a stroke rate of between 1–2 strokes/min in said first operation mode.

4. The hydraulic press according to claim 2 wherein said control block includes a valve, where said valve is a servo valve, a continuous valve, or a proportional-control valve.

5. The hydraulic press according to claim 1, wherein the hydraulic connector comprises:

a shut-off valve operatively connected to said first hydraulic device of said hydraulic transformer, said shut-off valve prohibiting said hydraulic transformer from operating said press ram during the first operation mode.

6. The hydraulic press according to claim 5, wherein the second hydraulic device is capable of producing two directions of flow.

7. The hydraulic press according to claim 1, wherein the first hydraulic device is operable as pump having a first direction of flow and as a motor having a second direction of flow opposite to said first direction of flow.

8. The hydraulic press according to claim 1, further comprising:

a tachometer operatively connected to said first hydraulic device.

9. The hydraulic press according to claim 1, wherein the first and second hydraulic devices operate for driving said press ram in said second operation mode, but not in said first operation mode.

10. A hydraulic press comprising:

a cylinder/piston;

a press ram coupled to said cylinder/piston;

a drive unit;

a first drive for driving the cylinder/piston and press ram, said first drive including a high-pressure accumulator adapted to be pressurized with a hydraulic fluid by said drive unit, said press ram being operated by said first drive in a first operation mode for simulating a mechanical press having a high ram speed and a low stroke rate; and a second drive for driving the cylinder/piston and press ram, said second drive including a hydraulic transformer having first and second hydraulic devices, said first hydraulic device being operated by said accumulator and said second hydraulic device coupled with and driven by said first hydraulic device, said press ram being operated by said second drive in second operation mode having a low ram speed and a high stroke rate, wherein hydraulic connector decouples said first drive and said second drive during the first operation mode.

11. The hydraulic press according to claim 10, further comprising;

a control block operatively connecting said drive unit to said high-pressure accumulator and said high-pressure accumulator to said press ram, said control block capable of controlling a motion of said press ram in the first operation mode.

12. The hydraulic press according to claim 11, wherein the hydraulic connecter comprises:

a shut-off valve operatively connected to first hydraulic device of said hydraulic transformer, said shut-off valve prohibiting said hydraulic transformer from operating said press ram during the first operation mode.

13. The hydraulic press according to claim 12, wherein the first and second hydraulic devices operate for driving said press ram in said second operation mode, but not in said first operation mode.

* * * * *